United States Patent [19]

Gupta

[11] 3,897,257

[45] July 29, 1975

[54] LIGHT TRANSMITTING POLYCRYSTALLINE MAGNESIA MEMBER AND METHOD OF MAKING

[75] Inventor: Tapan K. Gupta, Wilkinsburg, Pa.

[73] Assignee: Westinghouse Electric Corporation, Pittsburgh, Pa.

[22] Filed: Sept. 19, 1973

[21] Appl. No.: 398,899

[52] U.S. Cl. ............... 106/73.2; 106/58; 106/39.5
[51] Int. Cl. ............................................. C03c 3/26
[58] Field of Search.................... 106/73.2, 58, 39.5

[56] References Cited
UNITED STATES PATENTS 3,026,210  3/1962  Coble.................................. 106/73.4
3,432,314  3/1969  Mazdiyasni.................... 106/73.2 X
3,567,472  3/1971  Bratton............................. 106/58 X Primary Examiner—Winston A. Douglas
Assistant Examiner—John F. Niebling
Attorney, Agent, or Firm—W. D. Palmer

[57] ABSTRACT

Light-transmitting polycrystalline member consists essentially of magnesium oxide with from 0.3% to 4% by weight of dysprosium oxide dispersed therein. The density of the member approximates theoretical. To make the member, the desired weight percent of dysprosium oxide powder is dispersed in magnesium oxide powder and the mixture is first isostatically pressed to form a green compact. The compact is then sintered in oxygen at from about 1,800°C to about 2,000°C for at least about 3 hours.

5 Claims, 4 Drawing Figures

LIGHT TRANSMITTING POLYCRYSTALLINE MAGNESIA MEMBER AND METHOD OF MAKING

BACKGROUND OF THE INVENTION

This invention generally relates to a polycrystalline magnesia member and, more particularly, to a polycrystalline magnesia member having a density which approximates theoretical, and to a method for making such a member.

Polycrystalline alumina arc tubes, such as are suitable for arc-discharge devices, as well as methods for making the same, are disclosed in U.S. Pat. No. 3,026,210, dated Mar. 20, 1962 to R. L. Coble. Such arc tubes have been used commercially in recent years for high-pressure sodium-mercury discharge devices.

Materials other than alumina have also been fabricated into polycrystalline members of tubular form and a magnesium-aluminate spinel member having such a configuration is disclosed in U.S. Pat. No. 3,567,472 dated Mar. 2, 1971, to R. J. Bratton.

Polycrystalline magnesia could also be used for such applications but so far, synthesis of transparent or light-transmitting polycrystalline magnesia has been accomplished only by a hot pressing technique such as reported in Materials Research Bulletin, Vol. 2 (1967), pages 1,075–1,086, article by E. Carnall, Jr. entitled "The Densification of MgO in the Presence of a Liquid Phase." Such a process generally consists of a vacuum-hot pressing a mixture of magnesium oxide plus 1% by weight of lithium fluoride flux at a pressure of 10,000 to 15,000 psi and a temperature of about 1,000°C, followed by a final post heat treatment such as 1,400°C maintained for an extended period. Such a hot-pressing technique is prohibitively expensive if other than very simple shapes are to be fabricated.

SUMMARY OF THE INVENTION

In accordance with the present invention, there is provided a light-transmitting polycrystalline magnesia member having from 0.3% to 4% by weight of dysprosia dispersed therein, said member having a density which approximates the theoretical density of the magnesia and the added, dispersed dysprosia. To prepare such a member, there is first formed a finely divided or powdered mixture of magnesium oxide with dysprosium oxide uniformly dispersed therein in the amount as desired in the processed member. This mixed powder is filled into an isostatic pressing mold and isostatically pressed at a pressure of at least 15,000 psi to form a green compact. The formed compact is then sintered at a temperature of from about 1,800°C to about 2,000°C in an oxygen atmosphere for a period of at least about 3 hours.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENT

Figure 1:
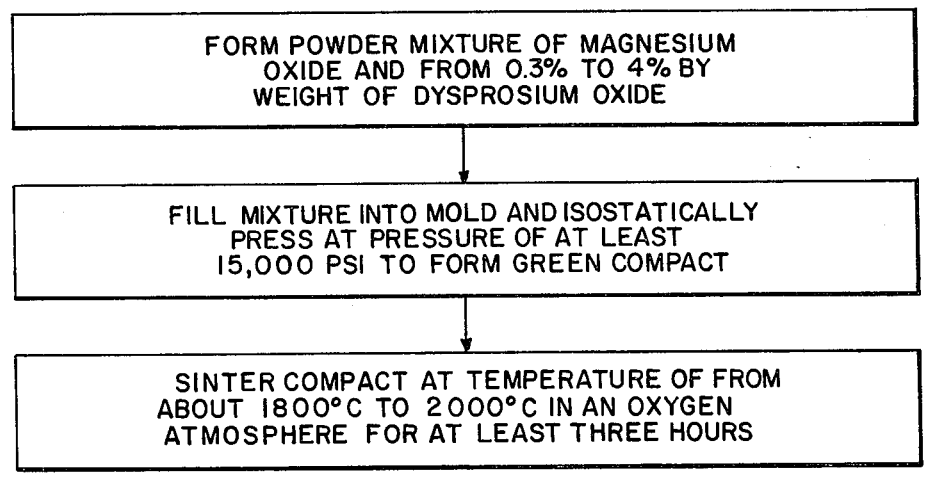
FIG. 1 is a flow diagram setting forth the basic steps of the present method.

The preparation of the present magnesia members is outlined in the flow diagram of FIG. 1. In order to prepare the finely divided magnesium oxide used for synthesizing the present polycrystalline magnesia, magnesium hydroxide is obtained as a precipitate by adding ammonium hydroxide to an aqueous solution of reagent grade hydrated magnesium chloride. The concentration of the solution is not critical, but as an example, the magnesium chloride is used in such amount as to yield a concentration of one gram of magnesium hydroxide and dopant per cc of solution. Dysprosium is added as the chloride to the solution in predetermined amount to yield from 0.3 weight percent to 4 weight percent of equivalent dysprosium oxide taken with respect to the equivalent weight of magnesium oxide. As a specific example, dysprosium chloride is added in such amount as to yield 0.5% by weight dysprosium oxide taken with respect to the amount of equivalent magnesium oxide which is present. The resulting precipitate is separated and calcined at a temperature of about 1,050°C for a period of 4 hours to convert the hydroxides to the oxides. The resulting doped magnesium oxide powder comprises particles which are extremely finely divided and somewhat irregular in shape, although they generally have a cubic configuration. The general range for ultimate particle size is between 20 nm and 200 nm. This particle size range is not critical with respect to obtaining the desired polycrystalline magnesia structure and particles up to about 400 nm in size have been used.

The foregoing dysprosia-doped magnesia is filled into an isostatic pressing mold which conventionally has mold dimensions a predetermined amount larger than the dimensions desired for the final article or member to allow for the densification encountered during the pressing and later sintering. In the case of a tubular member, the mold cavity has tubular dimensions with the center member or mandrel of the mold comprising a stainless steel cylinder. Isostatic pressures which are used in forming the green, pressed compact are not critical and as an example, can be varied from 15,000 psi (1,060 kg/cm$^2$) to 50,000 psi (3,530 kg/cm$^2$). This normally results in a green or pressed density which is about 50% of the theoretical density of magnesium oxide.

The green or pressed compact is then presintered by heating in air at a temperature of at least about 900°C for at least about 2 hours in order to provide the pressed, green compact with some additional strength to facilitate handling. The presintering is not mandatory, but is highly desirable. The presintered compact is then final sintered at a temperature of from about 1,800°C to about 2,000°C in an oxygen atmosphere for a period of at least about 3 hours.

Sintering at a temperature of less than about 1,800°C will require an unduly long sintering time and sintering at a temperature appreciably above about 2,000°C will result in some surface evaporation of the magnesia. Optimum sintering conditions are a temperature between 1,850°C to 2,000°C maintained for a period of from 4 to 6 hours.

Sintering in an atmosphere such as hydrogen has not been found to be desirable since the hydrogen appears to react with the magnesium oxide. Vacuum can be used as a sintering atmosphere, but may result in excessive evaporation of the magnesia.

Figure 2:
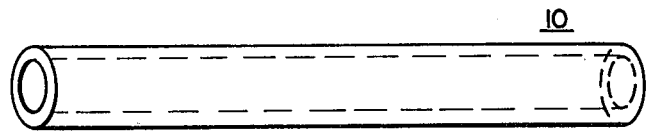
FIG. 2 is an isometric view of a tubular member suitable for use with an arc discharge device, which tube has been formed of the present magnesia.

In FIG. 2 is shown an isometric view of a polycrystalline magnesia tube 10, formed in accordance with the present method, and which can be used in fabricating an arc tube for an arc-discharge device.

Figure 3:
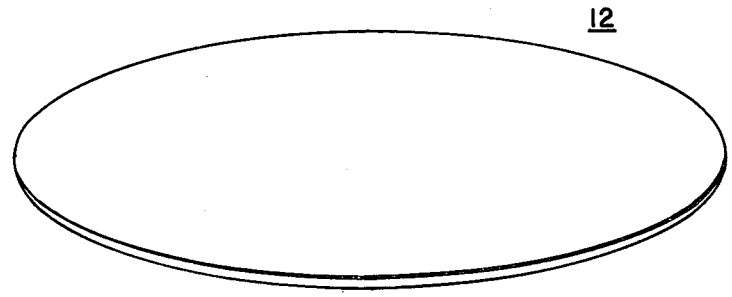
FIG. 3 is an isometric view of a magnesia member formed as a flat plate or viewing window.

In FIG. 3 is shown an isometric view of a polycrystalline magnesia planar member or window formed in accordance with the present method, and which can be used with high-temperature apparatus for transmitting infrared radiations.

With respect to the amounts of added dysprosium oxide which are necessary to obtain the deisred crystalline structure, if less than 0.3% by weight of dysprosium oxide is used, the grain growth is excessive and considerable porosity will be present in the sintered member, which greatly reduces radiation-transmitting characteristics thereof. If more than 4% by weight of dysprosium oxide is utilized there is formed a second phase, which impairs the light-transmission characteristics of the member.

Figure 4:
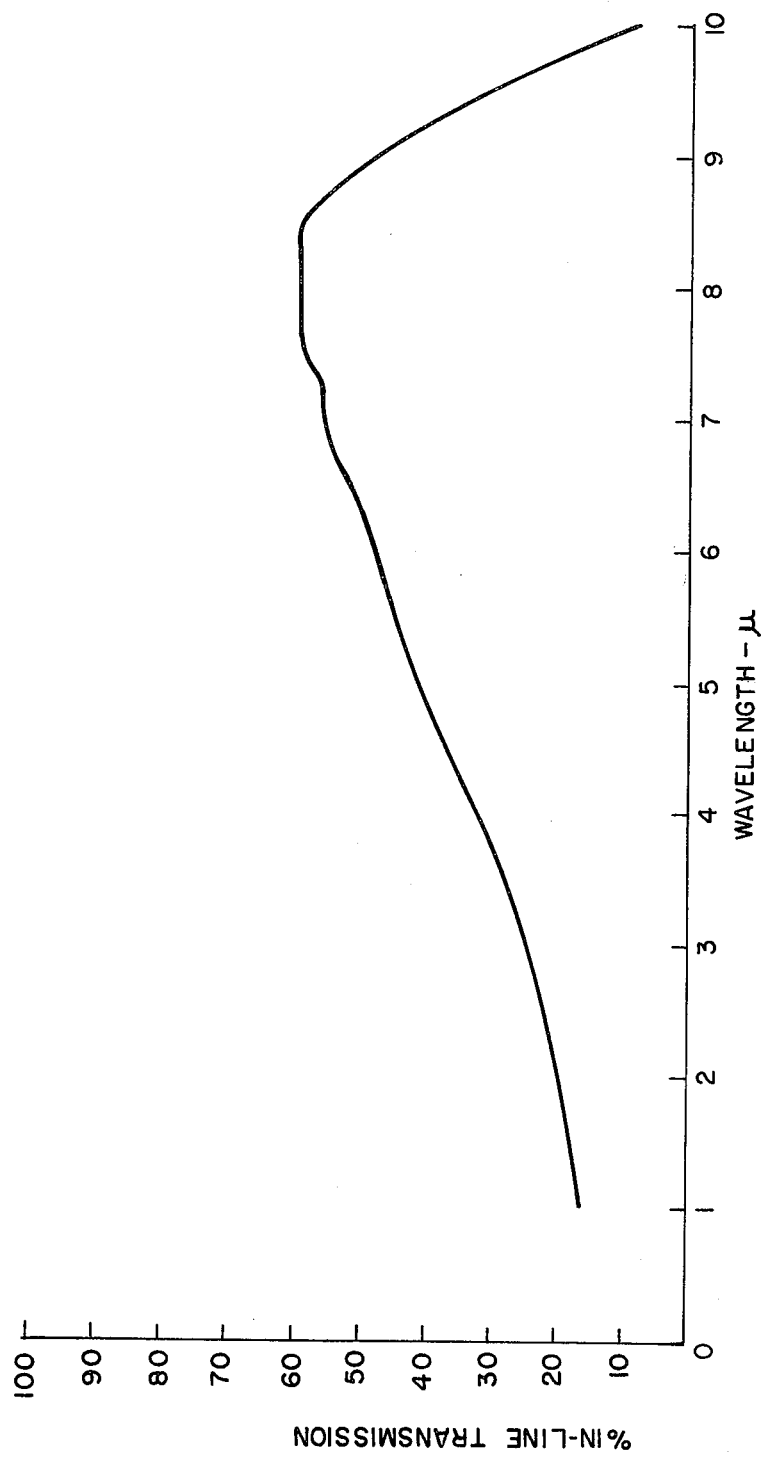
FIG. 4 is a graph of percent in-line transmission versus wavelength showing the relatively high transmissivity of the present magnesia members for infrared radiations.

In the visible range, the light-transmission characteristics of the present magnesia members are equivalent to those of polycrystalline alumina members. In the infrared, however, the radiation-transmission characteristics of the present magnesia members are excellent and a graph of percent transmission versus wavelength (in microns) for in-line transmission is shown in FIG. 4. As shown, at a wavelength of about 8 microns, the in-line transmission is about 60%.

Up to fifty weight percent of the dysprosium oxide dopant can be replaced by calcium oxide dopant, without appreciably reducing the quality of the sintered magnesia member. For best results, however, it is preferred to use dysprosium oxide dopant as a grain-growth inhibitor in the range of from 0.5% to 2% by weight.

I claim:

1. A radiation-transmitting polycrystalline magnesia member having from 0.3% to 4% by weight of dysprosia dispersed therein, and said member having a density which approximates the theoretical density of said magnesia plus dysprosia.

2. The member as specified in claim 1, wherein up to 50 weight percent of said dysprosia is replaced by calcium oxide.

3. The member as specified in claim 1, wherein said member has a tubular configuration.

4. The member as specified in claim 1, wherein said member has a generally planar configuration.

5. The member as specified in claim 1, wherein said dysprosia is present in amount of from 0.5% to 2% by weight of said magnesia.

* * * * *